United States Patent
Brown et al.

(10) Patent No.: US 8,244,268 B2
(45) Date of Patent: Aug. 14, 2012

(54) SYSTEM AND METHOD FOR COMMUNICATING WITH A PLURALITY OF REMOTE COMMUNICATION UNITS

(75) Inventors: Christopher A. Brown, Bloomington, IN (US); Andrew Figg, Bloomfield, IN (US); John F. Schneider, Huntingburg, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 412 days.

(21) Appl. No.: 12/571,315

(22) Filed: Sep. 30, 2009

(65) Prior Publication Data

US 2011/0077001 A1   Mar. 31, 2011

(51) Int. Cl.
*H04W 72/00* (2009.01)
*H04L 12/66* (2006.01)

(52) U.S. Cl. .................. 455/452.2; 370/352; 370/493

(58) Field of Classification Search .................. None
See application file for complete search history.

(56) References Cited

U.S. PATENT DOCUMENTS

| | | | |
|---|---|---|---|
| 2002/0001317 A1* | 1/2002 | Herring | 370/493 |
| 2004/0097227 A1 | 5/2004 | Siegel | |
| 2004/0123095 A1 | 6/2004 | Marshall | |
| 2005/0060543 A1 | 3/2005 | Anspach | |
| 2005/0063362 A1* | 3/2005 | Poulsen | 370/352 |
| 2005/0117566 A1 | 6/2005 | Davidson | |
| 2006/0019655 A1 | 1/2006 | Peacock | |
| 2006/0158329 A1 | 7/2006 | Burkley et al. | |
| 2006/0291483 A1 | 12/2006 | Sela | |
| 2007/0242670 A1 | 10/2007 | Simonson et al. | |
| 2008/0123630 A1 | 5/2008 | Fahrenthold | |
| 2008/0207315 A1 | 8/2008 | Bloebaum et al. | |
| 2008/0244148 A1 | 10/2008 | Nix, Jr. et al. | |

* cited by examiner

*Primary Examiner* — Erika Gary
(74) *Attorney, Agent, or Firm* — Christopher A. Monsey

(57) ABSTRACT

A communication system and method provides data and voice communication from a base unit to a plurality of mobile command units and a plurality of remote units located at different locations across a geographical area.

8 Claims, 7 Drawing Sheets

SYSTEM AND METHOD FOR COMMUNICATING WITH A PLURALITY OF REMOTE COMMUNICATION UNITS

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND AND SUMMARY

The present disclosure relates generally to systems and methods for providing communication to and from a plurality of remote units located at different locations across a geographical area. More particularly, a communication system and method provides data and voice communication from a base unit to a plurality of mobile command units and remote units located at different locations across the geographical area. The present communication system and method facilitates coordination of an operation such as a military operation, a first responder operation, or other law enforcement or emergency situation where communication coordination between a plurality of remote units is beneficial. Conventional communication systems use cellular phones or two-way radios to provide communication. Such cellular systems require cellular phone towers or other infrastructure to support the communication. Not all areas have suitable cellular infrastructure to provide support for robust communication systems. Two-way radios have limitations as well such as power consumption and the need for large batteries which hinders use in remote units which are typically carried by users on foot.

In an exemplary embodiment of the present disclosure, a mobile command unit for providing voice and data communications with at least one remote communication unit includes a plurality of voice receivers and a plurality of data receivers. Each voice receiver is configured to receive a voice signal from a different voice signal transmitter, and each data receiver is configured to receive a data signal from a different data signal transmitter. The illustrative mobile command unit also includes an audio module coupled to the plurality of voice receivers, the audio module being configured to extract voice information data from a plurality of different voice signals received by the plurality of voice receivers and to generate a plurality of digital voice packets having a uniform format from the extracted voice information data, and a data module coupled to the plurality of data receivers, the data module being configured to convert a plurality of different data signals received by the plurality of data receivers into digital data packets having a uniform format. The mobile command unit further includes a data stream manager coupled to the audio module and the data module, the data stream manager merging the digital voice packets from audio module with the digital data packets from data module to form a digital data stream, and a digital data transmitter coupled to the data stream manager, the digital data transmitter being configured to transmit the digital data stream to a compatible digital data receiver of at least one remote communication unit to provide both voice and data communication with the at least one remote communication unit.

In another exemplary embodiment of the present disclosure, a method for providing voice and data communications from a plurality of different sources to a remote communication unit includes receiving a plurality of different analog voice signals from a plurality of different analog voice signal sources, each of the analog voice signals including voice information data; extracting the voice information data from the plurality of received analog voice signals; and formatting the extracted voice information data into a plurality of digital voice packets having a uniform format. The illustrative method also includes receiving a plurality of different digital data signals from a plurality of different digital data sources; formatting the plurality of different digital data signals into a plurality of digital data packets having a uniform format; combining the digital voice packets and the digital data packets into a digital data stream; and transmitting the digital data stream to the remote communication unit to provide both voice and data communication with the remote communication unit.

In a further exemplary embodiment of the present disclosure, a mobile command unit provides voice and data communications between a base communication unit and a remote communication unit. The mobile command unit includes an analog voice receiver/transmitter configured to receive analog voice signals from the base unit and transmit analog voice signals to the base unit; a data receiver/transmitter configured to receive digital data signals from the base unit and transmit digital data signals from and to the base unit; an adapter coupled to the analog voice receiver/transmitter, the adapter being configured convert analog voice signals received by the voice receiver/transmitter into digital voice packets; and a switch coupled to the adapter and to the data receiver/transmitter. The switch is configured to combine the digital voice packets with digital data packets from the data receiver/transmitter into a digital data stream. An illustrated mobile command unit also includes a digital receiver/transmitter coupled to the switch. The digital receiver/transmitter is configured to transmit the digital data stream from the mobile command unit to the remote communication unit.

In yet another exemplary embodiment of the present disclosure, a plurality of command and control systems comprise first, second, third and fourth command and control system which communicate with each other in a hierarchical communication structure. The first command and control system includes a higher command unit having a data compiler/server configured to compile data from a plurality of sources and serve the compiled data, and a data receiver/transmitter coupled to the data compiler/server. The second command and control system includes a base unit having a voice receiver/transmitter, a first data receiver/transmitter configured to receive data signals from the higher command unit and transmit data signals to the higher command unit, a data filter configured to filter data received by the first data receiver/transmitter, and a second data receiver/transmitter configured to transmit filtered digital data signals from the base unit. The third command and control system includes a mobile command unit having a voice receiver/transmitter configured to receive voice signals from the base unit and transmit voice signals to the base unit, a data receiver/transmitter configured to receive data signals from the base unit and transmit data signals to the base unit, an audio module coupled to the voice receiver/transmitter. The audio module is configured to extract voice information data from the voice signals received by the voice receiver/transmitter and to generate a plurality of digital voice packets from the extracted voice information data. The third command and control system also includes a data module coupled to the data receiver/transmitter, the data module being configured to convert a plurality data signals into a plurality of digital data packets, and a digital data transmitter coupled to the audio module and the data module. The digital data transmitter is configured to transmit a digital data stream including the digital voice packets and the digital data packets. The fourth command and control system includes a remote unit having a remote digital data receiver/transmitter configured to receive the digital data stream from the mobile command unit, and a computing device coupled to the remote digital data receiver/transmitter. The computing device being configured to separate and process the voice packets and the data packets from the digital data stream. The fourth command and control system also includes a user interface. The user interface which has a data filter input selection function to permit a user to input, store and transmit a plurality of filter data parameters to mobile command unit and the base unit. The data filter of the base unit receives, stores and executes filtering of data information with the data filter based on the input filter parameters.

BRIEF DESCRIPTION OF THE DRAWINGS

The foregoing aspects and other features of this invention will become more readily appreciated and better understood by reference to the following detailed description when taken in conjunction with the accompanying drawings in which.

DETAILED DESCRIPTION OF THE DRAWINGS

Figure 1:
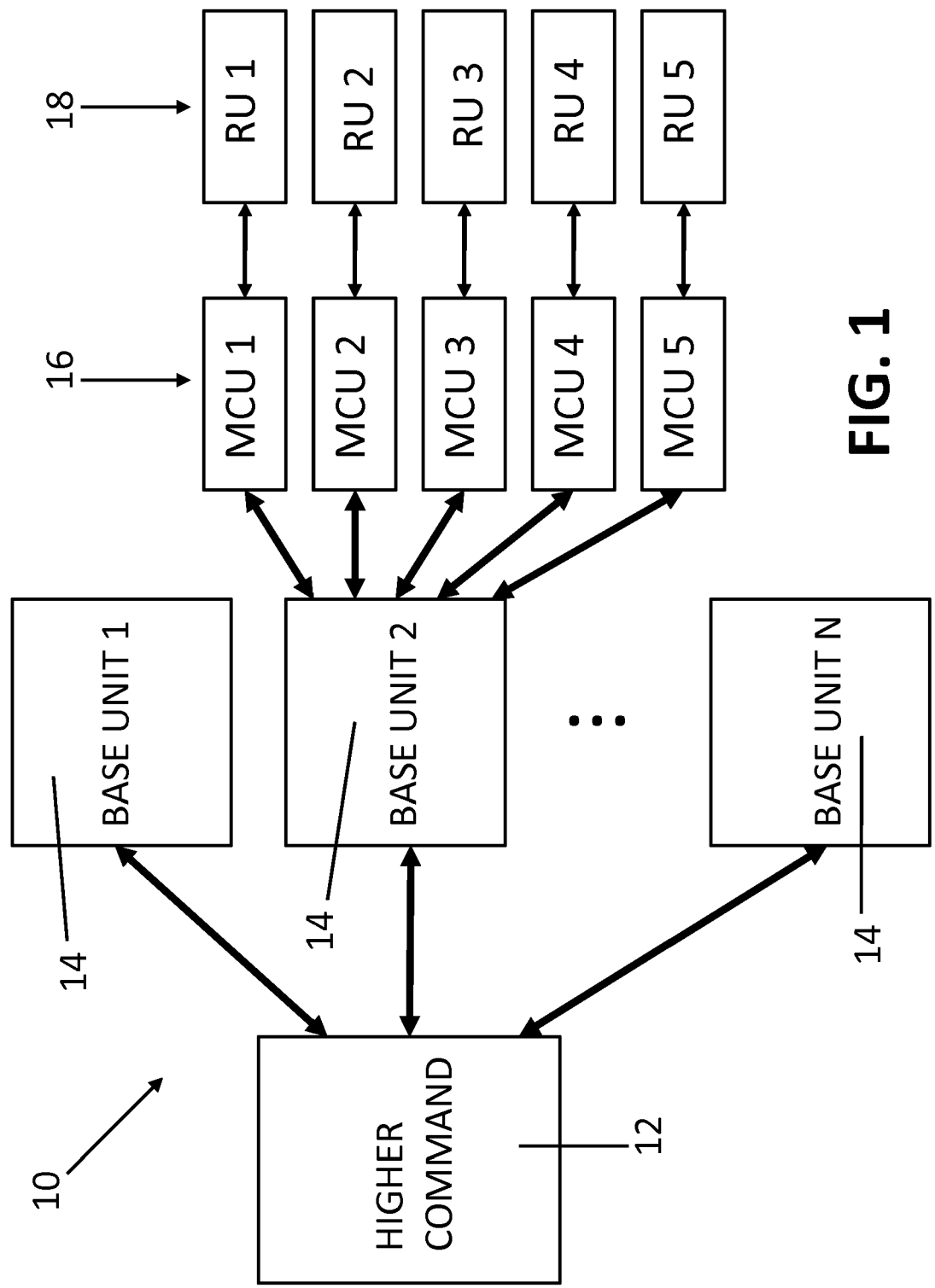
FIG. 1 is a block diagram illustrating one embodiment of the present disclosure for providing communications from a higher command to a plurality of base units, from each base unit to a plurality of mobile command units associated with the base unit, and from each mobile command unit to a remote or dismounted unit associated with the mobile command unit.

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates. Corresponding reference characters indicate corresponding parts throughout the several views.

FIG. 1 illustrates a communication system 10 for providing data and voice communication to a plurality of mobile command units 16 and remote units 18 located at different locations across a geographical area. The system 10 facilitates coordination of an operation such as a military operation, a first responder operation, or other law enforcement or emergency situation where communication coordination between a plurality of remote units 18 is beneficial. Conventional communication systems use cellular phones or two-way radios to provide communication. Such cellular systems require cellular phone towers or other infrastructure to support the communication. Not all areas have suitable cellular infrastructure to provide support for robust communication systems. Two-way radios have limitations as well such as power consumption and the need for large batteries which hinders use in remote units 18 which are typically carried by users on foot.

Referring to FIG. 1, a first illustrated embodiment of the present disclosure is shown. Communication system 10 provides communication from a higher command 12 to a plurality of base units 14, mobile command units 16 and remote units 18 which are illustratively spread out across a geographic area. Each base unit 14 communicates with a plurality of mobile command units 16 associated with the particular base unit 14. In an illustrated embodiment, the mobile command unit 16 is located within a vehicle movable to different locations within the geographic area. Each mobile command unit 16 communicates with at least one dismounted remote unit 18 as discussed in detail below. Both voice and data signals are transmitted from the base unit 14 to the mobile command unit 16 and then to the remote unit 18. Voice and data signals may also be transmitted from the remote unit 18 back to the mobile command unit 16 and then to the base unit 14.

Figure 2:
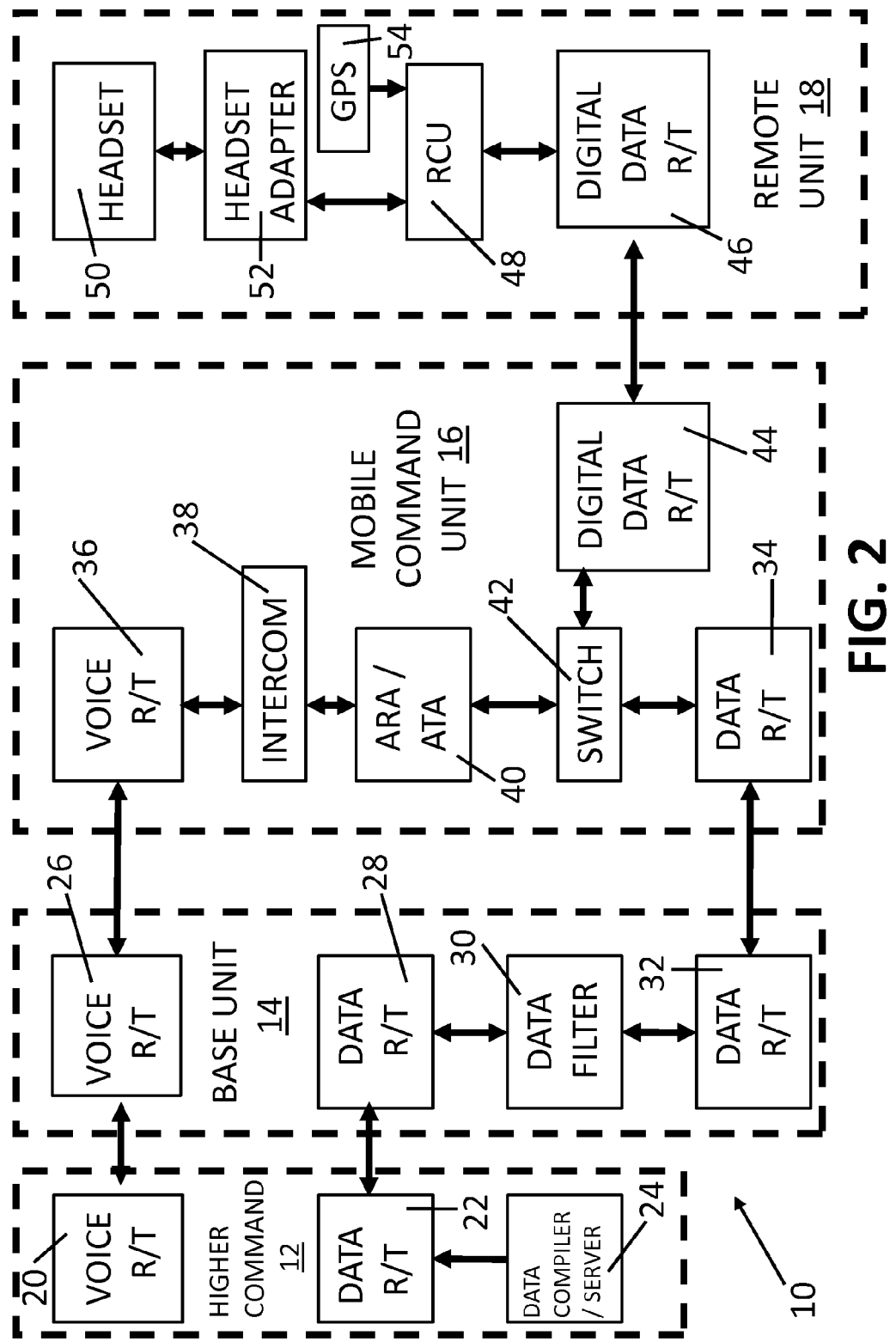
FIG. 2 is a block diagram illustrating additional details of a base unit, a mobile command unit, and a remote unit of FIG. 1.

As shown in FIG. 2, higher command 12 includes a voice receiver/transmitter 20 a data receiver/transmitter 22, and a data compiler/server 24. Illustratively, the higher command 12 compiles data from a plurality of sources which include the plurality of base units 14. Other data sources including radar information data, or other data from manned or unmanned aircraft may also be compiled by the data compiler 24. Other data sources that may be compiled and transmitted include, for example, satellite generated data, manually input data from other base units, and manually input data from personnel located at the higher command. For military applications, the higher command 12 may illustratively be located at a Forward Operating Base, a military base in the Area of Operation, a military base located in a foreign country, a military base located in the US, or the Pentagon, for example.

Each base unit 14 illustratively includes a voice receiver/transmitter 26 and a data receiver/transmitter 28. Voice receiver/transmitter 26 communicates with the voice receiver/transmitter 20 of higher command 12. The compiled data from server 24 is transmitted from data receiver/transmitter 22 of the higher command 12 to data receiver/transmitter 28 of base unit 14. Since base unit 14 is responsible for only a limited number of mobile command units 16 as shown in FIG. 1, only a small percentage of the compiled data received from the higher command 12 is relevant to the mobile command unit 16 assigned to a particular base station 14. Therefore, base unit 14 includes a data filter 30 to filter the information to be transmitted to a particular mobile command unit 16. For example, the data filter 30 may be based on a geographical area, a data type, or a track type. A "track" is a particular piece of information that a mobile command unit 16 or a remote unit 18 is interested in monitoring. For example, mobile command unit 16 and remote units 18 may be interested in tracking the location of all the other mobile command units 16 and remote units 18 within the group controlled by base unit 14. These tracks may appear on a display at each remote unit 18, for example. Other monitored tracks may also include friendly aircraft, enemy aircraft, other friendly ground units, enemy ground units, objective locations, objects of interest, and/or points of interest.

Filtered data from data filter 30 is supplied to another data receiver/transmitter 32 at base station 14 which communicates with a data receiver/transmitter 34 on the mobile command unit 16. Mobile command unit 16 also includes a voice receiver/transmitter 36. Data transmission between data receiver/transmitter 32 and data receiver/transmitter 34 is illustratively digital communications. Communication between voice receiver/transmitter 26 and voice receiver/transmitter 30 is typically an analog voice signal. In an illustrated embodiment, the voice signal is an analog radio signal. However, in other embodiments, the voice receiver/transmitters 20, 26 and 36 may be cellular telephone or telephone land lines.

In an illustrated embodiment, the mobile command unit 16 also includes an intercom 38. Intercom 38 permits an operator at the mobile command unit 16 to provide voice communications to the base unit 14 or the remote unit 18. The voice receiver/transmitter 36 and the intercom 38 are coupled to an analog radio adapter (ARA) 40 in one illustrated embodiment. ARA 40 provides an interface between a radio used as voice receiver/transmitter 36 and an IP based network to provide voice over IP (VoIP) or radio over IP (RoIP) communications. ARA 40 provides keying functions to operate the radio voice receiver/transmitter 36.

In another illustrated embodiment, such as when cellular or land line telephones are used for the voice receiver/transmitter 36, an analog telephony adapter (ATA) 40 is used to convert this analog voice signal from the voice receiver/transmitter 36 to a digital signal for use in the VoIP based communication network. The ARA/ATA 40 has an associated IP address so that the voice communication system is IP enabled. The ARA/ATA 40 and the data receiver/transmitter 34 are coupled to a switch 42. In an illustrated embodiment, the switch 42 is a standard Ethernet switch. Switch 42 receives digital voice data packets from the ARA/ATA 40 and digital data packets from data receiver/transmitter 34. Switch 42 illustratively determines the source of the data, determines the data content, and identifies a destination for the data, thereby decreasing bandwidth while providing high performance rates. The use of switch 42 provides an improvement over router based communication systems. Such routers are a more complicated piece of equipment to handle the routing of the information and typically require additional user programming and input. The switch based system of the present disclosure does not require such additional programming, user input or user control.

Data from switch 42 is sent to a wireless communication digital data receiver/transmitter 44. Different types of digital data receiver/transmitters may be used for the digital data receiver/transmitter 44. For example, for military or other high security applications, an encrypted data receiver/transmitter may be used to provide a secure wireless local area network connection to a digital data receiver/transmitter 46 of the remote unit 18. For example, an encrypted 802.11b Wi-Fi communication between the mobile command unit 16 and the remote unit 18 may be used. If encryption is not required, other suitable types of Wi-Fi communication, Bluetooth, or radio transmission may be used for data receiver/transmitters 44, 46.

Mobile command unit 16 transmits voice signals and digital data signals received from the base unit 14 to the remote unit 18 by first converting the analog voice signals to digital data packets and then using the VoIP communication to transmit the digital voice packets and the digital data packets via a single data stream between digital receiver/transmitter 44 of the mobile command unit 16 and the digital receiver/transmitter 46 of the remote unit 18.

Illustratively, the remote unit 18 includes a remote computing unit (RCU) 48 coupled to the digital receiver/transmitter 46. The RCU 48 may be a laptop computer, a PDA, a Netbook device, a Palm device, an Apple iPhone, or other suitable processing unit. The RCU 48 illustratively includes a display, an input device such as GUI or touch screen, a keypad or other user input for information at the remote unit 18. The filtered data from base unit 14 passes through mobile command unit 16 and may be displayed on the display of the RCU 48.

The remote unit 18 also includes a headset 50 to permit the user of the remote unit 18 to hear voice signals received from the mobile command unit 16 and to speak to the mobile command unit 16. For military applications, a headset adaptor 52 is provided between the RCU 48 and headset 50. Adaptor 52 increases the signal voltage supplied to the military headset 50 and also provides a suitable connector for the headset 50. For non-military applications, the headset adaptor 52 is not required and a standard computer compatible headset 50 may be used.

RCU 48 receives digital data packets and digital voice packets from the mobile command unit 16. RCU 48 processes the digital voice packets using the VoIP processing to provide voice communication to the remote unit 18. The filtered data is also processed by the RCU 48 and provided to the display of the remote unit 18. Remote unit 18 may also include a GPS 54 which automatically provides location information for the remote unit 18. The location information from GPS 54 is automatically sent from the remote unit 18 to the mobile command unit 16, the base unit 14, and the higher command 12 so that a current location of the remote unit 18 may be tracked. The remote unit 18 can also track other events or conditions in the field using the input device of RCU 48. In certain embodiments, a GUI, a touch screen or other input device may be used to automatically provide an indication of a certain conditions in the field, as observed by the remote unit 18. For example, the user at the remote unit 18 may input the location of an enemy ground unit. Unlike air units that can be tracked by radar, ground units, are manually input. If the operator at the remote unit 18 spots an enemy combatant on patrol, he can manually input the threat using the input device. Additionally, the remote unit 18 can be utilized to input friendly units not connected to the network. Likewise, the location of civilian units can be entered at the remote unit 18 using the input device. The remote unit 18 can also be used to designate the location of targets, points of interest, landing zones, or other geographical markers.

Figure 3:
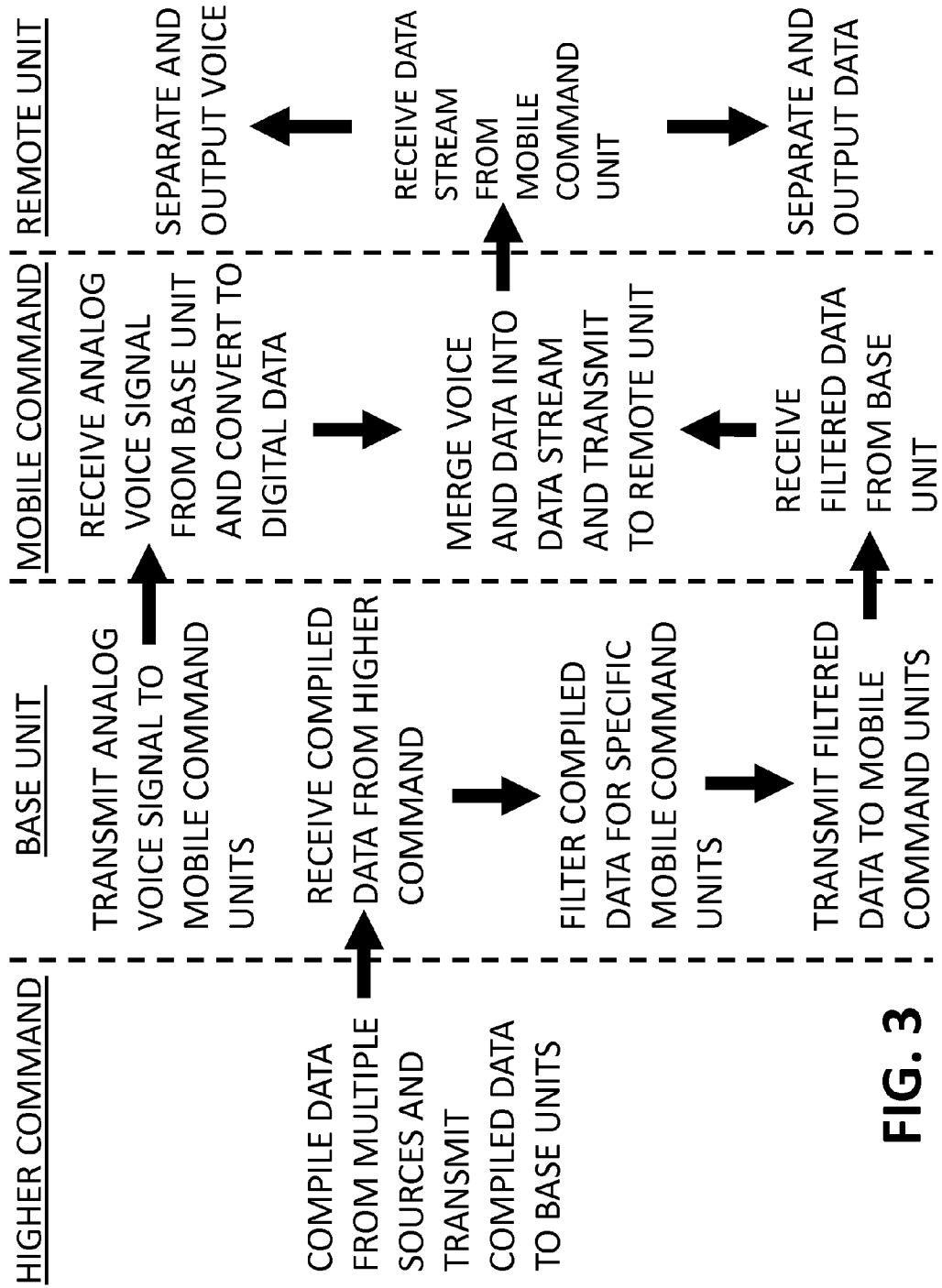
FIG. 3 illustrates data flow from the higher command to the base unit, from the base unit to the mobile command unit, and from the mobile command to the remote unit.

FIG. 3 illustrates additional details of the digital data flow and voice signal transmission between the higher command 12, base unit 14, mobile command unit 16, and remote unit 18. As discussed above, the higher command 12 compiles data from multiple sources and transmits the compiled data to the base units 14. The higher command 12 may also transmit voice signals to the base unit 14, if desired. The base units 14 receive the compiled data from the higher command 12 and then filter the compiled data for specific mobile command units 16 associated with or under the control of a particular base unit 14. The filtered data is then transmitted to the mobile command units 16 under control of the base unit 14. The base unit 14 also transmits analog voice signals to the mobile command units 16.

Each mobile command unit 16 receives the filtered digital data from the base unit 14 and also receives the analog voice signal from the base unit 14. The analog voice signal is converted a digital voice packets as discussed above. The mobile command unit 16 then merges the digital voice packets and digital data packets into a single digital data stream with switch 42 and then transmits to the digital data stream to remote unit 18. The remote unit 18 receives the digital data stream from the mobile command unit 16. RCU 48 at the remove unit 18 separates the digital data stream into the data and voice components for use at the remote unit 18.

Figure 4:
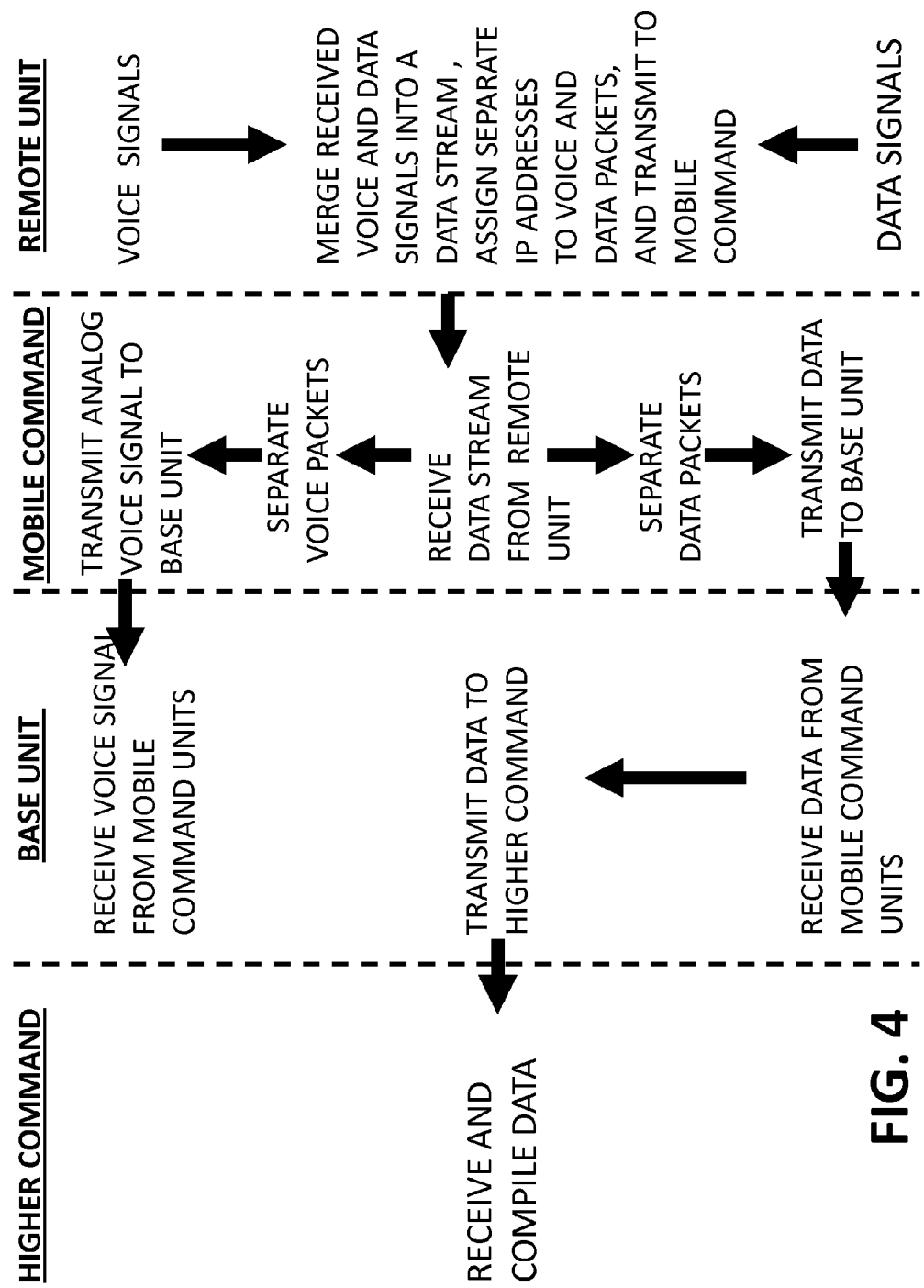
FIG. 4 illustrates data flow from the remote unit to the mobile command unit, from the mobile command unit to the base unit, and from the base unit to the higher command.

FIG. 4 illustrates flow of data and voice signals from the remote unit 18 to the mobile command unit 16, from the mobile command unit 16 to the base unit 14, and from the base unit 14 to the higher command 12. Voice signals may be generated by the remote unit 18 using the headset 50 coupled to the RCU 48. In addition, data signals may be generated by the remote unit 18 using input devices coupled to the RCU 48. RCU 48 converts the analog voice signals from headset 50 to digital voice packets and merges the digital voice packets with the digital data packets to form a data stream. Separate IP addresses are assigned to the digital voice packet and digital data packets in the data stream. The digital receiver/transmitter 46 of the remote unit 18 then transmits the digital data stream to the digital receiver/transmitter 44 of the mobile command unit 16. The digital data stream then passes to switch 42 which determines the data content and the IP address for the data. Voice data packets are separated and sent to the ARA/ATA 40 which converts the digital voice packets to analog voice signals for transmission using the voice receiver/transmitter 36. The ARA/ATA 40 can automatically generate keying tones to activate the voice receiver/transmitter 36. Intercom 38 may also be used to send voice transmissions from the mobile command unit 16 to the base unit 14.

Data packets separated by switch 42 are sent to the data receiver/transmitter 34 of mobile command unit 16 and then transmitted to the base unit 14 data receiver/transmitter 32. Base unit 14 therefore receives both the analog voice signals and the digital data signals from the mobile command units 16. At least the digital data signals are transmitted from the base unit 14 to the higher command 12 which receives and compiles the data. Voice signals may also be transmitted from the base unit 14 to the higher command 12, if desired.

Figure 5:
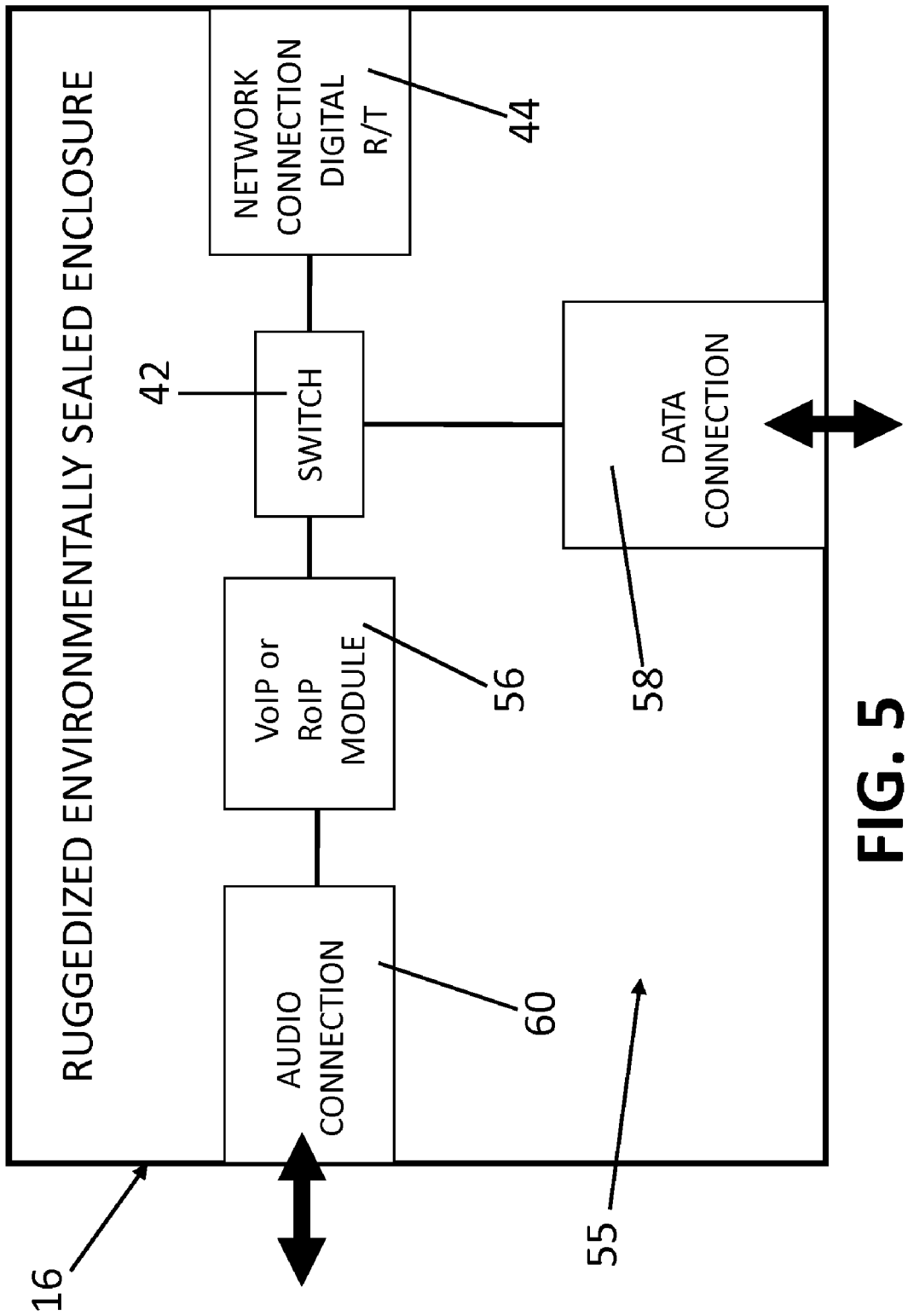
FIG. 5 is a block diagram illustrating details of a ruggedized, environmentally sealed enclosure for housing components of the mobile command unit therein.

FIG. 5 illustrates components of the mobile command unit 16 located in a ruggedized, environmentally sealed enclosure 55. The digital receiver/transmitter 44 for communication with the remote unit 18 is located in a sealed enclosure 55. The switch 42 and the VoIP or RoIP module 56 are also located in the ruggedized, environmentally sealed enclosure 55. Module 56 is coupled to switch 42 as discussed above. Module 56 has a separate IP address from a data connection 58 for data transmission to the data receiver/transmitter 34. For example, the data connection 58 may be a RJ-45 output which may be coupled to a suitable digital data receiver/transmitter 34. Module 56 is coupled to an audio connection 60 which is connectable to any suitable voice receiver/transmitter 36. In the illustrated embodiment of FIG. 5, the internal components within ruggedized, environmentally sealed enclosure 55 may all be formed on a single circuit board, if desired. Alternatively, separate components may be used. The container or enclosure 55 may illustratively be certified to meet applicable MIL-STD-810 testing requirements, IAW specifications or other desired standard such as NEMA enclosure standards, standards for completely submersible equipment, or the like.

Figure 6:
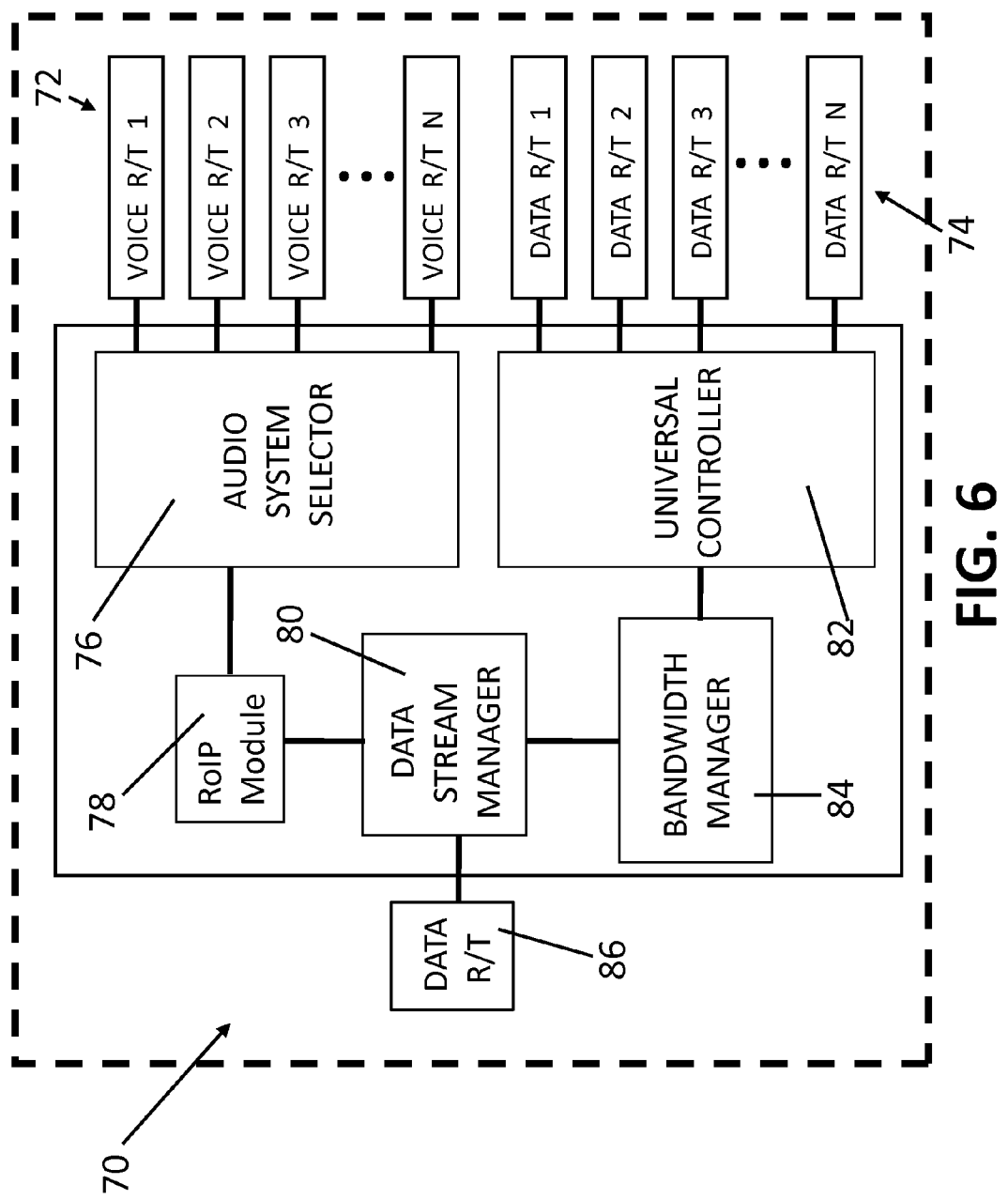
FIG. 6 is a block diagram of another embodiment of a mobile command unit.

FIG. 6 illustrates another embodiment of a mobile command unit 70. In the FIG. 6 embodiment, the mobile command unit 70 may be used to convert a plurality of analog voice signals received from a plurality of different voice transmitters operating at different frequencies into a single digital voice data stream for transmission to the remote unit 18 or 90. Likewise, the mobile command unit 70 may convert a plurality of digital data signals received from a plurality of different digital data transmitters into a single digital data stream for transmission to the remote unit 18 or 90. Illustratively, mobile command unit 70 includes a plurality of different voice receiver/transmitters 72, labeled as "Voice R/T 1", 2, 3 . . . N in FIG. 6. Mobile command unit 70 also includes a plurality of different digital data receiver/transmitters, labeled as "Data R/T 1", 2, 3 . . . N. In an illustrated embodiment, the receiver/transmitters 72 and 74 may be wideband multi-band multi-transmission radios.

Illustratively, a plurality of separate radios or other receiver/transmitters 72, 74 are used for each of the voice and data receiver/transmitters 72 and 74 illustrated in FIG. 6. Each of the different voice and data receiver/transmitters 72, 74 are illustratively tuned to different channel or frequency for receiving voice signals and data signals from the plurality of different sources. Illustrated examples of the voice frequencies include, but are not limited to, PSC5, HF voice, UHF/VHF voice, DAMA and the like. Examples of digital data frequencies include, but are limited to, TADIL, FBCB2, ROVER III, TLDHS, AFTDS, VAS and the like.

The plurality of voice receiver/transmitters 72 are coupled to an audio module including an audio system selector 76 and a RoIP or VoIP module 78. The audio system selector 76 extracts the voice information data from the analog voice signals received by the plurality of voice receiver/transmitters 72. An output from the audio system selector 76 is coupled to a RoIP or VoIP module 78 such as discussed above. Illustratively, an ARA or ATA device having a known IP address may be used in the module 78 as discussed above. An output from module 78 includes a digital voice packet stream having a uniform format which is supplied to a data stream manager 80.

The audio system selector 76 may be either be a digital or analog switch, physical or virtual, that allows the operator to select, locally or remotely, which type of receiver/transmitter being used to transmit the voice communications. The data stream manager is illustratively a switch, which may be a virtual switch or a physical switch. The RoIP module 78 may function as the ARA/ATA 40 discussed above. The module 78 may be virtual or physical. The system may combine the features of audio system selector 76 and RoIP module 78 into a single physical audio module with functions occurring virtually as software packets allowing for easier and more cost effective upgradeability.

Figure 7:
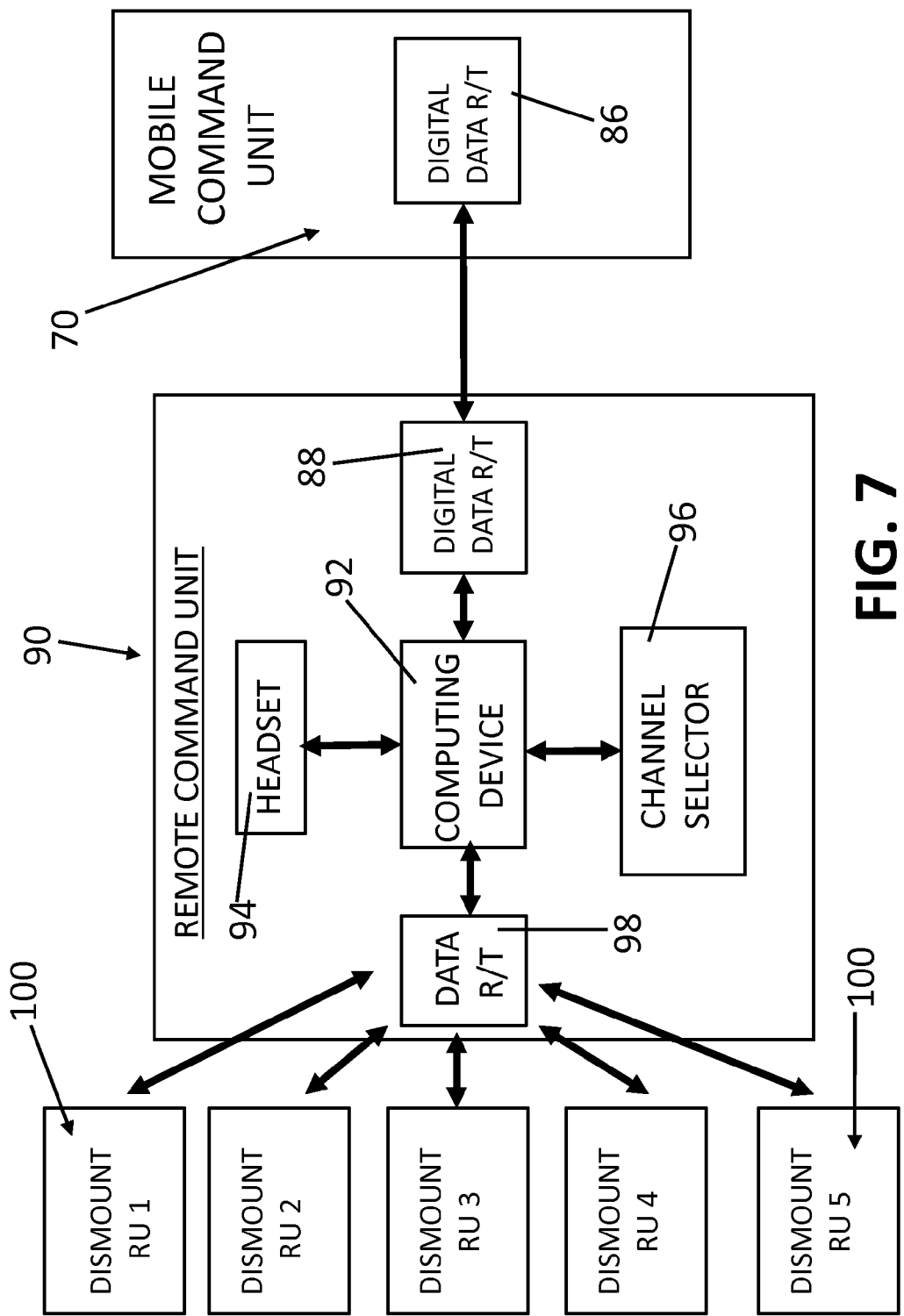
FIG. 7 is a block diagram illustrating communication between the mobile command unit of FIG. 6 and a dismounted remote command unit, and communication between the dismounted remote command unit and a plurality of other dismounted remote units.

The data received by data receiver/transmitters 74 illustratively has different frequencies and data formats depending on the source of the data. The plurality of data receiver/transmitters 74 are coupled to data module which is illustratively shown as a universal controller 82 which converts the different data formats received into a universal or common data format. An output of universal controller 82 is coupled to a bandwidth manager 84. Bandwidth manager 84 is coupled to the data stream manager 80 which merges the digital voice packets from module 78 and digital data packets from bandwidth manager 84 into a single data stream. Data stream manager 80 is coupled to a digital data receiver/transmitter 86 which transmits the digital data stream to a compatible digital data receiver/transmitter 88 of a dismounted remote command unit 90 such as shown in FIG. 7. Digital data receiver/transmitters 86 and 88 may be wideband radios with data capabilities as discussed above.

The universal controller 82 illustratively reads the incoming data streams from the plurality of data receiver/transmitters 74, strips out the information from the proprietary message format and reformats it to a predetermined, uniform format. The predetermined uniform format is based on the equipment that is being utilized for the digital data receiver/transmitter 86. In an illustrative embodiment, Geographic Information System (GIS) format or any other suitable uniform format may be used. The Army Corps of Engineers developed a format called GRASS GIS which may also be used. GRASS GIS is open source and used by a plurality of government and academic organizations. Bandwidth manager 84 illustratively measures and controls the communications (traffic, packets) on a network link to avoid filling the link to capacity or overfilling the link, which would result in network congestion and poor performance. The bandwidth manager 84 is illustratively a software packet that controls the flow of data to prevent collisions and congestion.

The embodiment of FIGS. 6 and 7 may be used to increase a range of communication for the dismounted remote units 90, 100. For example, the dismounted remote command unit 90 may be 2-5 miles away from the mobile command unit 70. In the embodiment of FIG. 7, the mobile command unit 70 communicates with multiple other dismounted remote units 100. The dismounted command unit 90 includes the digital data receiver/transmitter 88 and a computing device 92. Computing device 92 is coupled to a headset 94 and a channel selector 96. Computing device 92 receives the digital data stream from the mobile command unit 70 and separates the digital data packets from the digital voice packets to provide both voice communication and data communication to the dismounted command unit 90.

The dismounted command unit 90 further includes another digital data receiver/transmitter 98 coupled to the computing device 92 for communicating with compatible data receiver/transmitters on other dismounted remote units (RU) 100 labeled as "Dismount RU 1-5" in FIG. 7. A greater or lesser number of remote units 100 may be provided, as desired. Remote units 100 also communicate with the dismounted command unit 90 which, in turn, relays the messages to the mobile command unit 70. Communication between the remote command unit 90 and the dismounted remote units 100 may be via any suitable wireless communication device such a Wi-Fi connection, Bluetooth or other suitable wireless connection. Each of the dismounted remote units 100 may include a computing device or PDA 92, a headset 94, a channel selector 96 such as shown in the remote command unit 90. The difference between the remote command unit 90 and the other dismounted remote units 100 is the particular digital data receiver/transmitter 88 used in the remote command unit 90. The remote command unit 90 utilizes a longer range digital data receiver/transmitter 88 (hence a larger and heavier unit) than the data receiver/transmitter used in the other dismounted remote units 100. Remote command unit 90 acts as a range extender for the other dismounted remote units 100.

In an illustrated embodiment, the remote command unit 90 may be located in a backpack-type device worn by a user in the field. This backpack-contained communication system maintains mobility of the user while providing improved range of communication. As is discussed above, the portable remote command unit 90 extends the range that the dismounted units may venture from the mobile command unit 70 and also permits multiple remote units 90,100 to communicate back to the mobile command unit 70.

An illustrated embodiment of the communication system 10 may be used with a low altitude air defense (LAAD) battalion. In this embodiment, the base unit 14 is a section leader which illustratively leads five separate Fire Units which are the mobile command units 16 in FIG. 1, for example. The section leader 14 oversees deployment of the Fire Units 16 and directs their fires in support of the overall air defense plan. Illustratively, the Fire Unit 16 may be a stinger missile-based low altitude surface-to-air weapon system designed to provide close-in short range air defense. Each Fire Unit 16 communicates with at least one remote dismounted unit 18, 90, 100. As discussed above, the system 10 of the present disclosure provides data filtering and interfaces with different equipment sets for communications links between the higher command 12, the base units 14, the mobile command units 16 and the remote units 18. Various components are programmed with software used to transfer digital data back and forth. The data filter 30 of base unit 14 blocks out any data that a forward operator at the remote unit 18 does not want to see. The system includes an interfacing system for a programmable filtering system which is adapted to couple a plurality of command and control systems.

The data filter 30 is programmable by the base unit operator and by an operator at the remote unit 18 using an interfacing system for the programmable filtering system, such as the input device or GUI coupled to the RCU 48. Such filtering is controlled using the input device at the remote unit 18 to select or enable filter parameters, such as by selecting key words, selecting items from drop down menus, selecting a geographic area via a graphical user interface, and/or selecting other entity descriptors to set the filter parameters for use by the data filter 30.

Various methods for transferring data back and forth the between the higher command 12, the base units 14, the mobile command units 16 and the remote units 18 are provided. A user interface with specific inputs/outputs and a command and control system/intelligence distributed network system are provide which output data to user of the RCU 48 of the remote unit 18 on a push/pull basis which is used for a variety of applications to include common operating picture (COP) type graphical user displays.

The user input or interface and the RCU 48 of remote unit 18 are used to transmit filtering control data through the mobile command unit 16 to the base unit 14. A user at the base unit 14 and mobile command unit 16 can also input filtering data to the data filter 30 of base unit 14. Filtering may also be used at the higher command 12 level, if desired. Each level can filter both directions, if desired, but an illustrated embodiment of the system 10 is configured so that users at remote unit 18 or mobile command unit 16 cannot override filtering done at a higher level, such as base unit 14, except through a voice or data request can be sent to request higher level users to eliminate a filter to permit data information to flow down to the lower levels.

Communication between the higher command unit, the base unit, the mobile command unit and the remote unit may utilize various types of data and voice receiver/transmitters which transmit and receive Narrowband Waveforms, Wideband Waveforms, UHF Satcom Waveforms. Illustratively, the following frequencies may be utilized by the various data and voice receiver/transmitters:

30 MHz-2 GHz
Narrowband (NB):
VHF Low: 30-90 MHz
VHF High: 90-225 MHz

UHF Low: 225-512 MHz
SATCOM
UHF Low: 243-270 MHz and 292-318 MHz
Wideband (WB):
UHF: 225 MHz-2 GHz While this disclosure has been described as having exemplary designs and embodiments, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A plurality of command and control systems comprising:
a first command and control system including a higher command unit having a data compiler/server configured to compile data from a plurality of sources and serve the compiled data, and a data receiver/transmitter coupled to the data compiler/server;
a second command and control system including a base unit having a voice receiver/transmitter, a first data receiver/transmitter configured to receive data signals from the higher command unit and transmit data signals to the higher command unit, a data filter configured to filter data received by the first data receiver/transmitter, and a second data receiver/transmitter configured to transmit filtered digital data signals from the base unit;
a third command and control system including a mobile command unit having a voice receiver/transmitter configured to receive voice signals from the base unit and transmit voice signals to the base unit, a data receiver/transmitter configured to receive data signals from the base unit and transmit data signals to the base unit, an audio module coupled to the voice receiver/transmitter, the audio module being configured to extract voice information data from the voice signals received by the voice receiver/transmitter and to generate a plurality of digital voice packets from the extracted voice information data, a data module coupled to the data receivers receiver/transmitter, the data module being configured to convert a plurality data signals received by the data receiver/transmitter into a plurality of digital data packets, and a digital data transmitter coupled to the audio module and the data module, the digital data transmitter being configured to transmit a digital data stream including the digital voice packets and the digital data packets; and
a fourth command and control system including a remote unit having a remote digital data receiver/transmitter configured to receive the digital data stream from the mobile command unit; a computing device coupled to the remote digital data receiver/transmitter, the computing device being configured to separate and process the voice packets and the data packets from the digital data stream, and a user interface, wherein said user interface comprises a data filter input selection function which permits a user to input, store and transmit a plurality of filter data parameters to mobile command unit and the base unit, wherein said data filter within said base unit receives, stores and executes filtering of data information with the data filter based on said filter parameters.

2. The system of claim 1, wherein said mobile command unit communicates with the base unit via at least one of a wideband multi-band multi-transmission radio, a Wi-Fi connection, and a Bluetooth connection.

3. The system of claim 1, wherein said mobile command unit communicates with the remote unit via at least one of an encrypted wireless local area network connection and an encrypted Wi-Fi connection.

4. The system of claim 1, wherein said data filter further comprises user profile data which is adapted to store first and second user category data, wherein filter data received by said data filter comprises a user category data which is used by said data filter to determine if a filter data update request is authorized or unauthorized.

5. The system of claim 1, wherein voice communication between the base unit, the mobile command unit and the remote unit is open, unfiltered communication, while data communication is filtered by the data filter of the base unit.

6. The system of claim 1, wherein communication between the higher command unit, the base unit, the mobile command unit and the remote unit utilizes at least one of Narrowband Waveforms, Wideband Waveforms, UHF Satcom Waveforms.

7. The system of claim 1, wherein communication between the higher command unit, the base unit, the mobile command unit and the remote unit occurs at frequencies from 30 MHz-2 GHz.

8. The system of claim 1, wherein the plurality of data sources providing data to the a data compiler/server of the higher command unit include at least one of radar information data, data from aircraft, satellite generated data, manually input data from the base unit, and manually input data from an operator of the higher command unit.

* * * * *